Nov. 30, 1965

TAKESHI MORI 3,220,497

ROTARY DRAG BIT

Filed Aug. 26, 1963

INVENTOR.
*TAKESHI MORI*
BY
*Bernard Kriegel*
ATTORNEY.

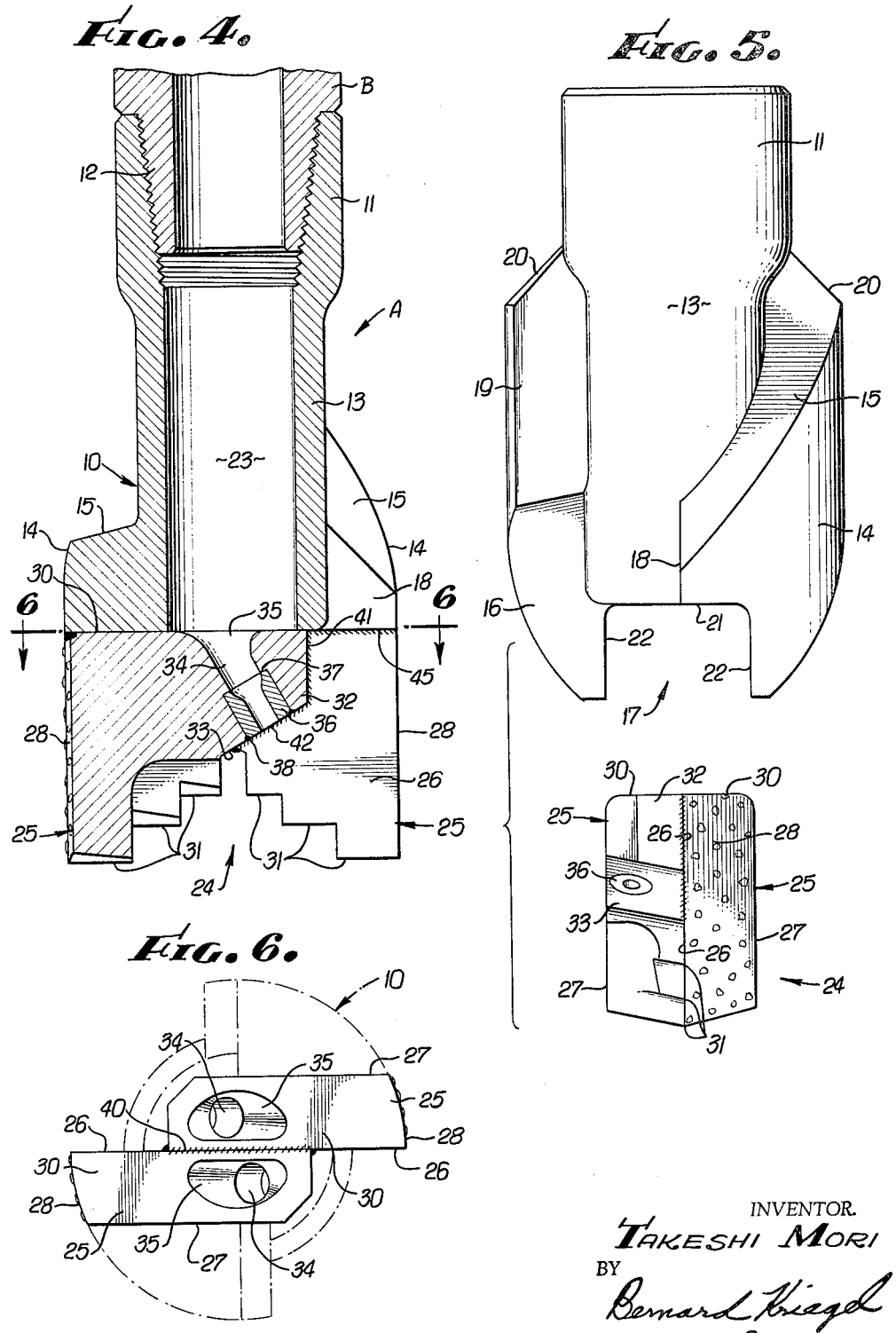

United States Patent Office 3,220,497
Patented Nov. 30, 1965

3,220,497
ROTARY DRAG BIT
Takeshi Mori, Salt Lake City, Utah, assignor to Christensen Diamond Products Company, Salt Lake City, Utah, a corporation of Utah
Filed Aug. 26, 1963, Ser. No. 304,530
12 Claims. (Cl. 175—411)

The present invention relates to rotary drill bits for drilling oil, gas, and similar well bores, and more particularly to rotary drill bits of the drag type.

An object of the invention is to provide a rotary drag bit in which a set of drag cutters can be variously fixedly mounted on the bit body to determine the hole cutting diameter of the bit.

Another object of the invention is to provide a rotary drag bit in which a set of blades can be placed in overlapping relation to each other to determine the effective hole cutting diameter of the bit, the effective drilling diameter being readily varied by altering the extent of overlap of the blades, preferably prior to assembly of the blades in the bit body.

A further object of the invention is to provide a rotary drag bit having passages through which drilling fluid can be discharged, which are more economical to produce and which are located in portions of the bit that are more resistant to fluid erosion. More specifically, the discharge portions of the fluid passages are provided in the drag blades themselves, rather than in the bit body, such passage portions being easier to machine in the blades than in the body, streamlined guides for the drilling fluid being more readily obtainable and easier to manufacture in the blades, and the blade material being harder and more resistant to erosion than the body material.

An additional object of the invention is to provide a rotary drag bit of strong and sturdy construction, which is comparatively easy to assemble and economical to manufacture.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 4 is a longitudinal section taken generally along the line 4—4 on FIG. 2;

FIG. 5 is an exploded view of the body and drag blade cutter structure of the drill bit, prior to assembly of the latter in the bit body;

FIG. 6 is a section taken along the line 6—6 on FIG. 4;

Figure 1:
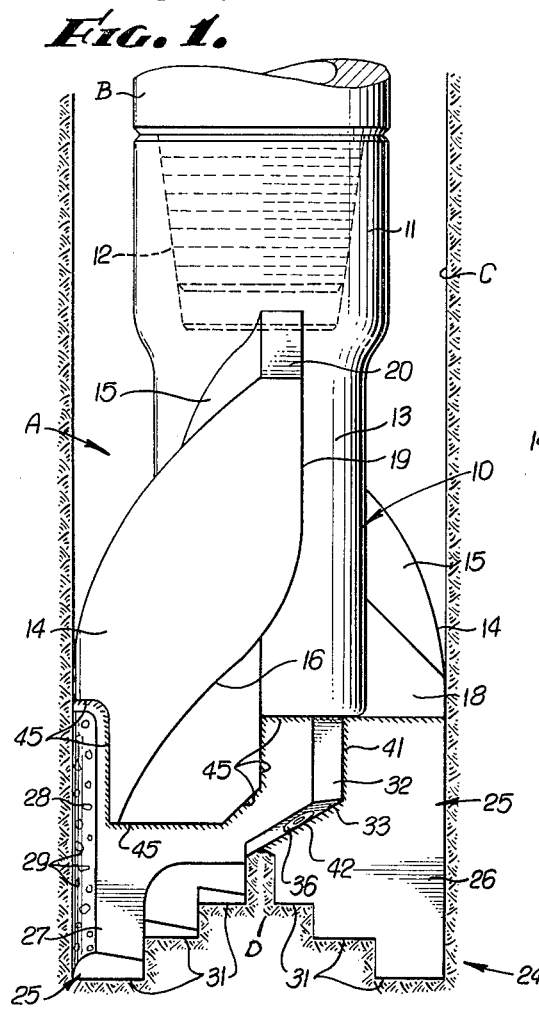
FIGURE 1 is a front elevational view of a rotary drill bit embodying the invention and disposed in a well bore.
Figure 2:
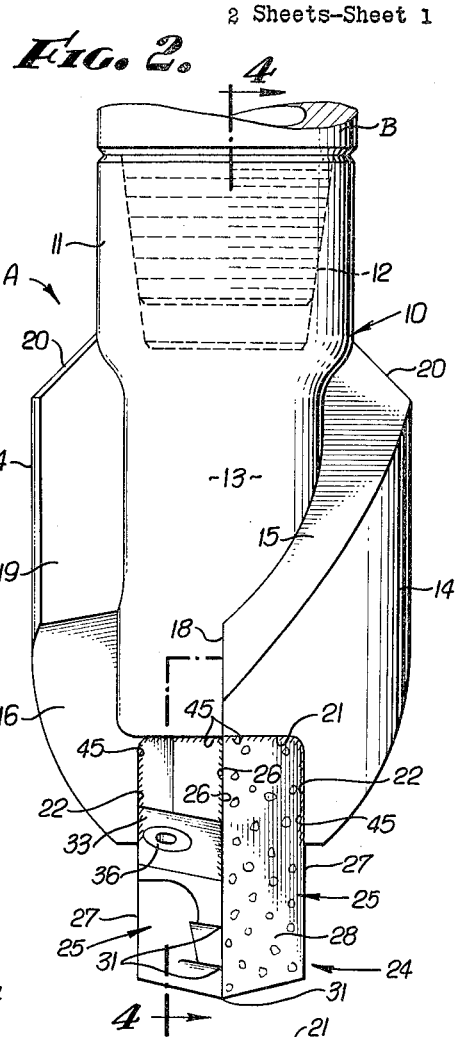
FIG. 2 is a side elevational view of the drill bit disclosed in FIG. 1.
Figure 3:
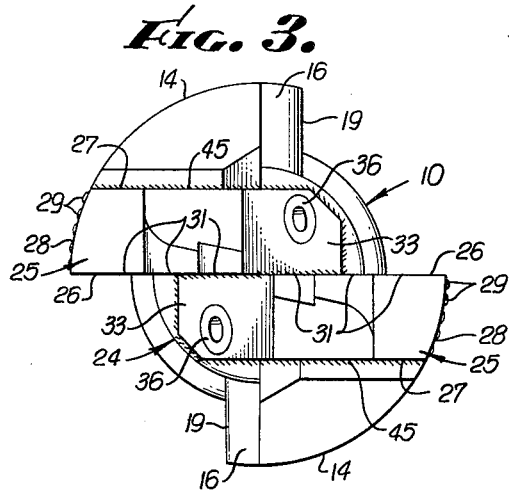
FIG. 3 is a bottom plan view of the drill bit disclosed in FIG. 1.
Figure 7:
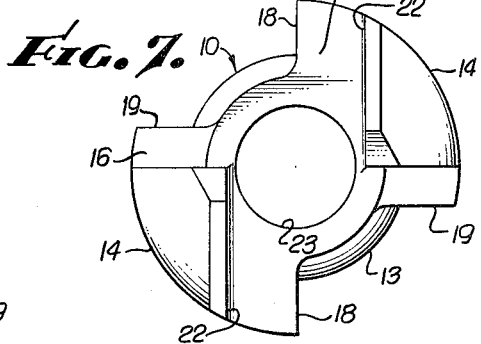
FIG. 7 is a bottom view of the bit body disclosed in FIG. 5.

The rotary drill bit A illustrated in the drawings is of the drag type and includes a main bit body 10 having a suitable upper threaded connection 11, such as a threaded box, to receive a companion threaded element or pin 12 of a drill pipe section B, the drill pipe extending to the top of the well bore C, and by means of which the drill bit is rotated within the bore hole. Drilling fluid is pumped downwardly through the drill pipe B and through the bit A for the purpose of removing the cuttings and maintaining the bit in a cool and clean condition.

As shown, the drill bit body includes a central portion 13 that has circumferentially spaced, diametrically opposed arcuate pads 14 integral therewith, the diameter across the pads being substantially equal to the diameter of the bore hole C being drilled. The outer surface of the pads preferably has hardfacing material (not shown) applied thereto, in a known manner, for resisting wear. The pads 14 themselves extend upwardly from the lower end of the bit body, each pad having an upper surface 15 inclined in an upward and counterclockwise direction, and also a lower surface 16 inclined upwardly in a counterclockwise direction. In the specific drill bit illustrated in the drawings, the pads are spaced from one another circumferentially to a substantial extent.

The main bit body has a central transverse slot 17 formed in its lower portion and opening through its bottom end, such slot also extending through the lower portions of its pads 14. Each pad 14 has a vertical leading face 18 terminating in the central plane of the body slot 17, and a trailing vertical face 19 displaced in a counterclockwise direction substantially from its leading face, which may, for example, be about 100 degrees. The upper inclined surface 15 of each pad 14 tapers from its leading face 18 to an upper beveled portion 20 inclined in an upward and inward direction, such beveled portion terminating at the trailing face 19. The beveled portions 20 serve as guides in facilitating upward passage of the drill bit in the well bore past bends, obstructions or restrictions therein, so as to prevent the bit from hanging up during its elevation in the well bore.

The body slot 17 has an upper transverse surface or base 21 extending completely across the central portion of the body 10 and across its opposed pads 14, and also parallel sides 22, in the central portion 13 of the body and also in its pad portions 14. A central fluid passage 23 in the body section 13 of the bit opens downwardly through the base 21 of the body slot, such fluid passage being of comparatively large diameter, as illustrated most clearly in FIG. 4.

A drag blade sub-assembly 24, comprising a pair of drag cutter blades 25, is mounted in the body slot 17. Each drag blade has a leading face 26 that has a suitable hardfacing material applied thereto and a trailing face 27 parallel to the leading face, as well as an outer gauge or reaming surface 28, which may have hardfacing material applied thereto and also, if desired, diamond cutting elements 29, to insure the maintenance of the blades to proper gauge during the action of drilling the bore hole C. The blades 25 may be identical, each blade having an upper surface 30 normal to its gauge surface 28 and to its leading and trailing faces 26, 27. The lower end of each blade is stepped downwardly in a lateral outward direction, providing a series of stepped lower cutting edges 31 adapted to operate upon the bottom D of the well bore. The inner portion 32 of each blade is adapted to extend across the axis of the drill bit body 10 when mounted in the latter, its lower surface 33 being inclined from its cutting portions in an upward direction. Extending diagonally through such inner portion 32 of each blade is a fluid passage 34 having an upper inlet 35. A nozzle 36 is mounted in the lower portion of the passage 34 in abutting relation to a shoulder 37 in the blade, the nozzle being suitably secured to the blade, as by use of welding material 38, and opening downwardly through the lower surface 33.

The leading faces 26 of a pair of blades are placed against one another and in overlapping relation with their upper surfaces 30 coplanar, the extent of overlap being such as to provide the effective drilling diameter of the blade assembly 24, which is the diameter across their outer gauge or reaming surfaces 28. The blades are then welded to one another along their abutting upper edges 40, as well as along the regions 41, 42 between the inner portions 32 and the adjacent leading faces 26 of the opposite blades. Following such welding, the weld along the upper abutting edges 40 of the blades is ground flush. The overall width of the pair of blades conforms to the width of the body slot 17, so that the blade sub-assembly 24 can be slipped upwardly into the body slot with their upper surfaces 30 in abutting relation to the base 21 of the body slot or groove. The blade assembly 24 is then centered with respect to the body 10 of the tool and is secured thereto, as by use of welding material, welds 45 being provided at the exposed surfaces of the body and the adjacent portions of the blades to functionally integrate the blades and body to one another, and in a manner to prevent fluid leakage from the body passage 23 between the upper surfaces 30 of the blades and the base 21 of the slot 17. With the blades welded to the body, the gauge surfaces 28 of the blades may be on substantially the same cylindrical surface as the outer surfaces of the pads 14, or the gauge diameter of the blades may exceed the diameter across the pads.

With the blade sub-assembly 24 welded to the bit body 10, it is to be noted that the upper inlet portion 35 of each fluid passage 34 in a blade opens upwardly into the lower end of the central fluid passage 23 in the bit body. The inlet portion 35 of each fluid passage is preferably curved and made divergent in an upward direction, to provide a streamline flow of the fluid from the body passage 23 into the blade passage 34, such fluid being capable of discharging through the nozzle 36 toward the bottom D of the well bore immediately in advance of the leading face 26 of the other blade. Thus, the nozzle 36 in one blade is adapted to direct fluid in a downward and outward direction in advance of the leading face 26 of the opposite blade to clean the bottom of the well bore of cuttings, as well as to maintain the leading face of the bit clear of cuttings, the cuttings being flushed upwardly through the relatively wide spaces between the pads 14 along the exterior of the central portion 13 of the bit body and upwardly through the well bore annulus around the string of drill pipe B to the top of the hole C.

The diameter across the outer surfaces of the stabilizing pads 14 can be less than the effective hole drilling diameter of the arcuate gauge surfaces 28 of the drag cutter blades 25. In fact, for the same bit body 10 and drag blades 25, larger hole diameters can be drilled than the diameter across the pad outer surfaces. Thus, the blades 25 can be overlapped with respect to each other to a lesser extent, so that the effective diameter of the blade assembly is increased, and such blade assembly, with the blades previously welded to each other, inserted into the body slot or groove 17 and centered with respect thereto, and then welded to the body 10 and its pads 14, the bit then being capable of drilling a bore hole of an increased diameter. It is apparent that by varying the extent of overlap of a pair of blades 25, the effective cutting diameter of the drill bit can be determined.

It is to be noted that the fluid passages 34 are formed through the blades 25 themselves, rather than through the bit body or its pads, with the nozzles 36 mounted in the blade passages themselves. The provision of the nozzles in the blade passages makes it easier and more economical to produce a drill bit, since it is much easier to machine the inclined passages 34 in the blades than to machine them within the drill bit body. Moreover, the streamlining of the passage inlet 35 for gradually changing the direction of fluid flow from the central passage 23 of the bit body is more readily obtainable, since the inlet portions of the blades are readily accessible, such inlet portions being formed in the blades prior to their assembly to one another. Moreover, since the material of which the blades 25 are made is ordinarily much harder than the material of which the main body 10 of the bit and its pads are made, the walls of the fluid passages 34 are more resistant to erosion and will, therefore, possess a much longer life.

In the use of the drill bit A in drilling the bore hole C, it is threadedly attached to the lower end of the string of drill pipe B and lowered in the well bore, the proper drilling weight being imposed on the bit to force its lower cutting edges 31 against the bottom D of the hole while the string of drill pipe and bit are rotated at the proper speed, fluid being circulated downwardly through the pipe and through the drill bit to remove the cuttings. The torque is transmitted from the bit body 10 through the trailing sides 22 of the body slot 17 to the companion trailing sides 27 of the cutter blades. The drilling weight itself is transmitted directly through the base 21 of the body slot to the upper ends 30 of the cutter blades. Thus, although the welds strongly integrate the blades to one another and to the bit body and its pads, the main drilling weight and torque is transmitted directly from the bit body 10 to the cutter blades 25.

During the drilling action, circulating fluid is pumped down through the central fluid passage 23 of the body and into the fluid passages 34 in the blades, discharging through the nozzles 36 against the bottom D of the hole to clean it of cuttings in advance of the leading faces 26 of the blades, as well as the blades themselves, the cuttings being flushed upwardly around the bit body 10 and the drill pipe B to the top of the well bore.

The drill bit illustrated has a comparatively long useful life and operates in a smooth fashion, the pads stabilizing the drill bit.

I claim:

1. In a rotary drill bit: a main body adapted to be secured to a rotary drill string, said body having a central slot therein extending transversely across its lower portion and opening downwardly through its lower end, said slot having substantially parallel sides and an upper base; a cutter blade assembly mounted in said slot and extending below the lower end of said body, said assembly comprising a pair of blades having coplanar leading faces and trailing faces, said blades overlapping each other with said coplanar leading faces in mutual contact, the upper ends of said blades engaging said base, and said trailing faces confronting the sides of said slot; and means immovably securing said blades to each other and to said body.

2. In a rotary drill bit: a main body adapted to be secured to a rotary drill string, said body having a central slot therein extending transversely across its lower portion and opening downwardly through its lower end, said slot having substantially parallel sides and an upper base; a cutter blade assembly mounted in said slot and extending below the lower end of said body, said assembly comprising a pair of blades having coplanar leading faces and trailing faces, said blades overlapping each other with said coplanar leading faces in mutual contact, the upper ends of said blades engaging said base, and said trailing faces confronting the sides of said slot; said blades being welded to said body and to each other along their overlapping upper ends; each blade also having its inner end portion welded to the opposite leading face of the other blade.

3. In a rotary drill bit: a main body adapted to be secured to a rotary drill string, said body having a central slot therein extending transversely across its lower portion and opening downwardly through its lower end, said slot having substantially parallel sides and an upper base; a cutter blade assembly mounted in said slot and extending below the lower end of said body, said assembly comprising a pair of blades having coplanar leading faces, trailing faces, and outer gauge surfaces, said blades overlapping each other with said coplanar leading faces in mutual contact, the upper ends of said blades engaging said base, said trailing faces confronting the sides of said slot, and said gauge surfaces having an effective diameter at least equal to the maximum diameter of said body; and means immovably securing said blades to each other and to said body.

4. In a rotary drill bit: a main body adapted to be secured to a rotary drill string and including a central section and circumferentially spaced pads integral with said central section and adapted to engage the wall of a well bore drilled by the bit, said central section and pads having a slot extending transversely across their lower portions; a cutter blade assembly mounted in said slot and extending below the lower ends of said central section and pads, said assembly comprising a pair of blades having coplanar leading faces contacting each other in overlapping relation and immovably secured to each other and to said body.

5. In a rotary drill bit: a main body adapted to be secured to a rotary drill string and including a central section and circumferentially spaced pads integral with said central section and adapted to engage the wall of a well bore drilled by the bit, said central section and pads having a central slot therein extending transversely across their lower portions and opening downwardly through their lower ends, said slot having substantially parallel sides and an upper base; a cutter blade assembly mounted in said slot and extending below the lower ends of said pads, said assembly comprising a pair of blades having coplanar leading faces and trailing faces, said blades overlapping each other with said coplanar leading faces in mutual contact, the upper ends of said blades engaging said base, and said trailing faces confronting the sides of said slot; and means immovably securing said blades to each other and to said body.

6. In a rotary drill bit: a main body adapted to be secured to a rotary drill string and including a central section and circumferentially spaced pads integral with said central section and adapted to engage the wall of a well bore drilled by the bit, said central section and pads having a central slot therein extending transversely across their lower portions and opening downwardly through their lower ends, said slot having substantially parallel sides and an upper base; a cutter blade assembly mounted in said slot and extending below the lower ends of said pads, said assembly comprising a pair of blades having coplanar leading faces, trailing faces, and outer gauge surfaces, said blades overlapping each other with said coplanar leading faces in mutual contact, the upper ends of said blades engaging said base, said trailing faces confronting the sides of said slot, and said gauge surfaces having an effective diameter at least equal to the maximum diameter of said pads; and means immovably securing said blades to each other and to said central section and pads.

7. In a rotary drill bit: a main body adapted to be secured to a rotary drill string, said body having a slot extending transversely across its lower portion and a main fluid passage opening downwardly into said slot; a cutter blade assembly mounted in said slot and extending below the lower end of said body, said assembly comprising a pair of cutter blades having coplanar leading faces contacting each other in overlapping relation and immovably secured to each other and to said body; said blades having fluid passages therein communicating with said main fluid passage and adapted to discharge fluid outwardly from the blades.

8. In a rotary drill bit: a main body adapted to be secured to a rotary drill string, said body having a slot extending transversely across its lower portion and a main fluid passage opening downwardly into said slot; a cutter blade assembly mounted in said slot and extending below the lower end of said body, said assembly comprising a pair of cutter blades contacting each other in overlapping relation and immovably secured to each other and to said body; each of said blades having a fluid passage therein communicating with said main fluid passage and adapted to discharge fluid downwardly in advance of the leading face of the other blade.

9. In a rotary drill bit: a main body adapted to be secured to a rotary drill string, said body having a central slot therein extending transversely across its lower portion and opening downwardly through its lower end, said slot having substantially parallel sides and an upper base, said body having a main fluid passage opening through said base; a cutter blade assembly mounted in said slot and extending below the lower end of said body, said assembly comprising a pair of blades having coplanar leading faces and trailing faces, said blades overlapping each other with said coplanar leading faces in mutual contact, the upper ends of said blades engaging said base, and said trailing faces confronting the sides of said slot; means immovably securing said blades to each other and to said body; each of said blades having a fluid passage extending from an upper inlet end in communication with said main fluid passage to a lower discharge end.

10. In a rotary drill bit: a main body adapted to be secured to a rotary drill string, said body having a central slot therein extending transversely across its lower portion and opening downwardly through its lower end, said slot having substantially parallel sides and an upper base, said body having a main fluid passage opening through said base; a cutter blade assembly mounted in said slot and extending below the lower end of said body, said assembly comprising a pair of blades having leading faces and trailing faces, said blades overlapping each other with said leading faces in mutual contact, the upper ends of said blades engaging said base, and said trailing faces confronting the sides of said slot; means immovably securing said blades to each other and to said body; each of said blades having a fluid passage extending from an upper inlet end in communication with said main fluid passage to a lower discharge end directed to discharge fluid downwardly in advance of the leading face of the other blade.

11. In a rotary drill bit: a main body adapted to be secured to a rotary drill string and including a central section and circumferentially spaced pads integral with said central section and adapted to engage the wall of a well bore drilled by the bit, said central section and pads having a slot extending transversely across their lower portions, said central section having a main fluid passage opening downwardly into said slot; a cutter blade assembly mounted in said slot and extending below the lower end of said central section and pads, said assembly comprising a pair of cutter blades contacting each other in overlapping relation and immovably secured to each other and to said body; said blades having fluid passages therein communicating with said main fluid passage and adapted to discharge fluid outwardly from the blades.

12. In a rotary drill bit: a main body adapted to be secured to a rotary drill string and including a central section and circumferentially spaced pads integral with said central section and adapted to engage the wall of a well bore drilled by the bit, said central section and pads having a slot extending transversely across their lower portions and opening downwardly through their lower ends, said slot having substantially parallel sides and an upper base, said central section having a main fluid passage opening downwardly through said base into said slot; a cutter blade assembly mounted in said slot and extending below the lower ends of said central section and pads, said assembly comprising a pair of blades having coplanar leading faces, trailing faces, and outer gauge surfaces, said blades overlapping each other with said coplanar leading faces in mutual contact, the upper ends of said blades engaging said base, said trailing faces confronting the sides of said slot, and said gauge surfaces having an effective diameter at least equal to the maximum diameter of said pads; means immovably securing said blades to each other and to said body; each of said blades having a fluid passage therein extending from an upper inlet end in communication with said main fluid passage to a lower discharge end directed to discharge fluid downwardly in advance of the leading face of the other blade.

References Cited by the Examiner
UNITED STATES PATENTS
1,477,931  12/1923  Bashara et al. _____ 175—393
1,494,274  5/1924  Morgan _____ 175—384 X
1,585,540  5/1926  Dougherty _____ 175—421 X
2,521,791  9/1956  Harrington _____ 175—411

CHARLES E. O'CONNELL, Primary Examiner.
BENJAMIN BENDETT, Examiner.